United States Patent
Henry

(10) Patent No.: US 9,609,800 B2
(45) Date of Patent: Apr. 4, 2017

(54) REMOTE LEVELING OF TILLAGE IMPLEMENTS USING INCLINOMETERS

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 174 days.

(21) Appl. No.: 14/565,794

(22) Filed: Dec. 10, 2014

(65) Prior Publication Data

US 2015/0156950 A1 Jun. 11, 2015

Related U.S. Application Data

(60) Provisional application No. 61/914,555, filed on Dec. 11, 2013.

(51) Int. Cl.
| | | |
|---|---|---|
| *A01B 63/22* | (2006.01) | |
| *A01B 63/00* | (2006.01) | |
| *A01B 51/04* | (2006.01) | |

(52) U.S. Cl.
CPC .............. *A01B 63/22* (2013.01); *A01B 51/04* (2013.01); *A01B 63/002* (2013.01)

(58) Field of Classification Search
CPC ..... A01B 63/002; A01B 63/008; A01B 63/10; A01B 63/14; A01B 63/22; A01B 5/04
USPC ........................................ 172/663, 664, 668
See application file for complete search history.

(56) References Cited

U.S. PATENT DOCUMENTS

| | | | |
|---|---|---|---|
| 3,759,332 A * | 9/1973 | Robertson, Sr. ...... | A01B 21/083 172/239 |
| 4,840,233 A * | 6/1989 | Friggstad ............... | A01B 51/00 172/311 |
| 4,878,543 A | 11/1989 | Kauss | |
| 5,957,218 A | 9/1999 | Noonan et al. | |
| 6,144,910 A | 11/2000 | Scarlett et al. | |
| 6,220,366 B1 | 4/2001 | Noonan et al. | |
| 6,305,478 B1 | 10/2001 | Friggstad | |
| 6,547,012 B2 | 4/2003 | Scarlett et al. | |
| 7,142,956 B2 | 11/2006 | Heiniger et al. | |
| 7,766,093 B2 | 8/2010 | Becker et al. | |
| 8,352,121 B2 | 1/2013 | Bitter | |
| 8,359,988 B2 | 1/2013 | Bassett | |
| 2004/0016556 A1 | 1/2004 | Barber | |

(Continued)

FOREIGN PATENT DOCUMENTS

| | | |
|---|---|---|
| CA | 2 289 240 A1 | 5/2000 |
| FR | 2 651 957 A1 | 9/1989 |

*Primary Examiner* — Gary Hartmann

(74) *Attorney, Agent, or Firm* — Rebecca L. Henkel; Rickard K. DeMille

(57) ABSTRACT

An agricultural implement having agricultural implement for supporting a plurality of gangs of disk blades extending generally laterally relative to a forward travel direction. The implement has carrier frames pivotally connected to wheel assemblies for controlling the height of the carrier frames relative to the ground through hydraulic actuators acting on the wheel assemblies. The hydraulic control unit enables independent and individual control of each actuator. An electronic control unit (ECU) receives signals from a series of inclinometers where each inclinometer signal is compared to the others and the individual actuator operated to bring the actuators into in uniform synchronization.

18 Claims, 4 Drawing Sheets

(56) References Cited

U.S. PATENT DOCUMENTS

| | | |
|---|---|---|
| 2006/0021235 A1 | 2/2006 | Becker |
| 2007/0068238 A1 | 3/2007 | Wendte |
| 2008/0267719 A1 | 10/2008 | Corcoran |
| 2012/0048159 A1 | 3/2012 | Adams et al. |
| 2012/0048160 A1 | 3/2012 | Adams et al. |
| 2012/0215410 A1 | 8/2012 | McClure et al. |
| 2012/0305321 A1 | 12/2012 | Wagger |
| 2013/0032363 A1 | 2/2013 | Curry et al. |
| 2015/0129255 A1 * | 5/2015 | Sudbrink ................. A01B 3/26 172/2 |
| 2015/0156948 A1 * | 6/2015 | Henry .................... A01B 63/22 172/1 |
| 2015/0156951 A1 * | 6/2015 | Henry .................... A01B 63/22 172/664 |
| 2015/0156952 A1 * | 6/2015 | Henry .................... A01B 63/22 172/1 |

* cited by examiner

REMOTE LEVELING OF TILLAGE IMPLEMENTS USING INCLINOMETERS

CROSS REFERENCE TO RELATED APPLICATIONS

This is a non-provisional application based upon U.S. provisional patent application Ser. No. 61/914,555, entitled "REMOTE LEVELING OF TILLAGE IMPLEMENTS USING INCLINOMETERS", filed Dec. 11, 2013, which is incorporated herein by reference.

BACKGROUND OF THE INVENTION

1. Field of the Invention

The present invention relates to farm implements, and, more particularly, to systems and methods for maintaining such implements level relative to the soil.

2. Description of the Related Art

In the continuing quest for providing greater efficiency in the operation of farm implements, machines have been constructed to have ever increasing lateral spans relative to a tractor or central unit propelling the unit over a field. When the span increases to realize greater efficiency and speed, the criteria of having a uniform and level tool contact with the soil becomes extremely critical. Equipment with significant lateral spans have many different joints and are usually articulated to enable transport to and between fields.

An area of special importance to level positioning of farm implements is found in the tillage field. The desirable outcome is a uniform physical depth of the tillage and a uniform entry of the disk blades or harrows into the soil. The need to have a level positioning of the implement is made more challenging with the use of hydraulic actuators which control the depth of penetration of the disk blades or other tools. In current practice, hydraulic actuators are connected in series and it is possible through normal operation for hydraulic fluid leakage to make the actuators out of sync with one another. In addition, field conditions, such as wheel loading and other variables, require an adjustment to the synchronization of the different sections of the tillage implement, thereby requiring the operator to dismount from a tractor and make manual adjustments.

It is current practice to partially counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished.

What is needed in the art therefore, is an efficient, simplified apparatus and method for maintaining agricultural implements in a level position relative to the soil.

SUMMARY OF THE INVENTION

An advantage of the present invention is a more accurate and efficient synchronization of multiple sections of a farm implement.

In one form, the invention is an agricultural implement spanning a lateral distance relative to a forward direction. The implement has a plurality of interconnected carrier frames, each for supporting a plurality of soil engaging tools. At least one supporting element is carried by each carrier frame for variably positioning the carrier frame relative to the soil. An actuator has a base and a variably positioned element connected between each supporting element and the respective carrier frame for varying the inclination of the respective carrier frame relative to the vertical reference. At least one inclinometer on each carrier frame determines the inclination of the respective carrier frame relative to the vertical reference and generates a signal. An actuator control unit is provided for each actuator to move the actuator independently in response to a signal input. An electronic control unit (ECU) receives the signal from the at least one sensor for each carrier frame and compares it to the inclination signals from the other of said sensors to send a resultant signal to said actuator control unit for varying the inclination of the at least one sensor to reach the inclination of the other sensors.

In another form, the invention is a method of leveling an agricultural implement relative to the soil with the agricultural implement including a plurality of articulated carrier frames, each for supporting a plurality of soil engaging tools and having at least one supporting element carried by the carrier frame for variably positioning the carrier frame relative to the soil. An actuator is provided for each supporting element with the actuator having a base and variably positioned element connected between the supporting elements and the carrier frame for setting the position of the carrier frame relative to the soil. The method includes the steps of determining the inclination of each carrier frame relative to the vertical and comparing the inclination of each carrier frame relative to the inclination of the other carrier frames. The inclination of said each carrier frame is corrected based on the inclination of the other carrier frames

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplifications is not to be construed as limiting the scope of the invention in any manner.

DETAILED DESCRIPTION OF THE INVENTION

Figure 1:
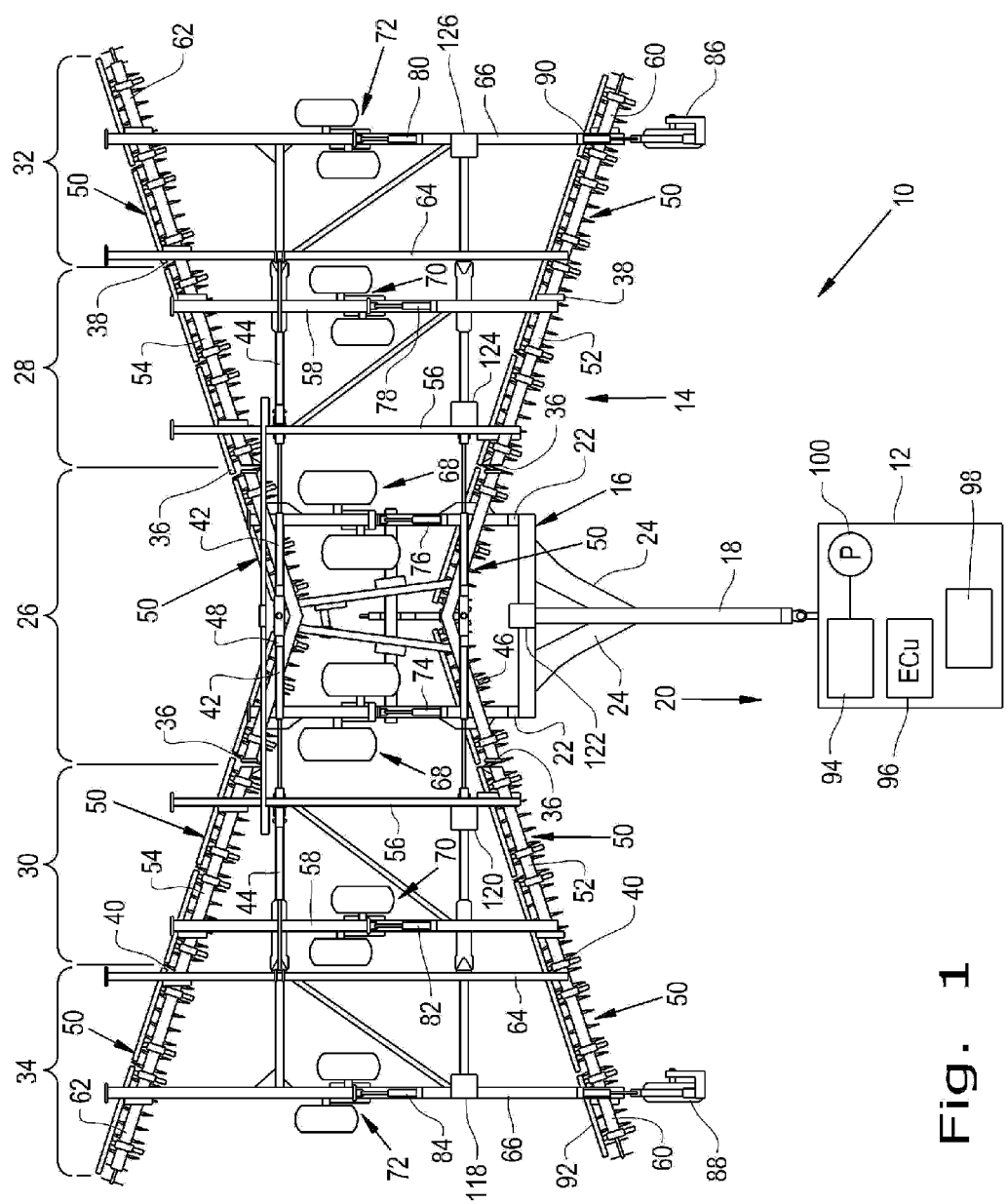
FIG. 1 illustrates a tillage implement including a support of disk blades embodying the present invention, being pulled by a tractor shown in schematic fashion.

Referring now to the drawings, and more particularly to FIG. 1, there is shown a tillage apparatus 10 which generally includes a tractor 12 shown schematically and an agricultural tillage implement 14 for tilling the soil prior to seeding. It should be noted that many different tools may be employed with the tillage implement 14 beyond the embodiment shown.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

The tillage implement 14 has a center section 26, an inner right wing section 28 and an outer right wing section 32 as viewed in FIG. 1. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted, the frame elements 46 and 48 extend generally laterally with respect to the direction of movement 20 of the agricultural implement. Frame members 46 and 48, however, extend at an angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

The various sections 26, 28, 30, 32 and 34 of the tillage implement 14 are positioned at variable positions relative to the soil and thus set the position of the gangs of disk harrows 50 above the soil and the depth they cut into the soil. As illustrated, the variable support elements are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to support and variably position inner wing sections 28 and 30 relative to the soil. In addition, wheel sets 72 are pivotally mounted on frame members 66 to support and variably position outer wing sections 32 and 34 at a variable distance relative to the soil. Actuators 74 and 76 manipulate wheel sets 68 to establish the distance of center section 26 relative to the soil. Actuators 78 and 80 support and variably position sections 28 and 32 relative to the soil. Finally, actuator assemblies 82 and 84 support and variably position sections 30 and 34 relative to the soil.

In addition, castor wheel assemblies 86 on section 32 and 88 on section 34 orient the fore and aft angle of the tillage implement 14 relative to the soil. Actuators 90 and 92 are employed for this purpose.

The actuators described above are shown as hydraulic and for this purpose a hydraulic control unit 94 is mounted in the tractor 12 and has a pump 100 for pressurizing hydraulic fluid to control the actuators. The hydraulic control unit 94 receives inputs from an electronic control unit (ECU) 96 which receives various inputs set out below, in addition to an operator input through control unit 98.

Figure 2:
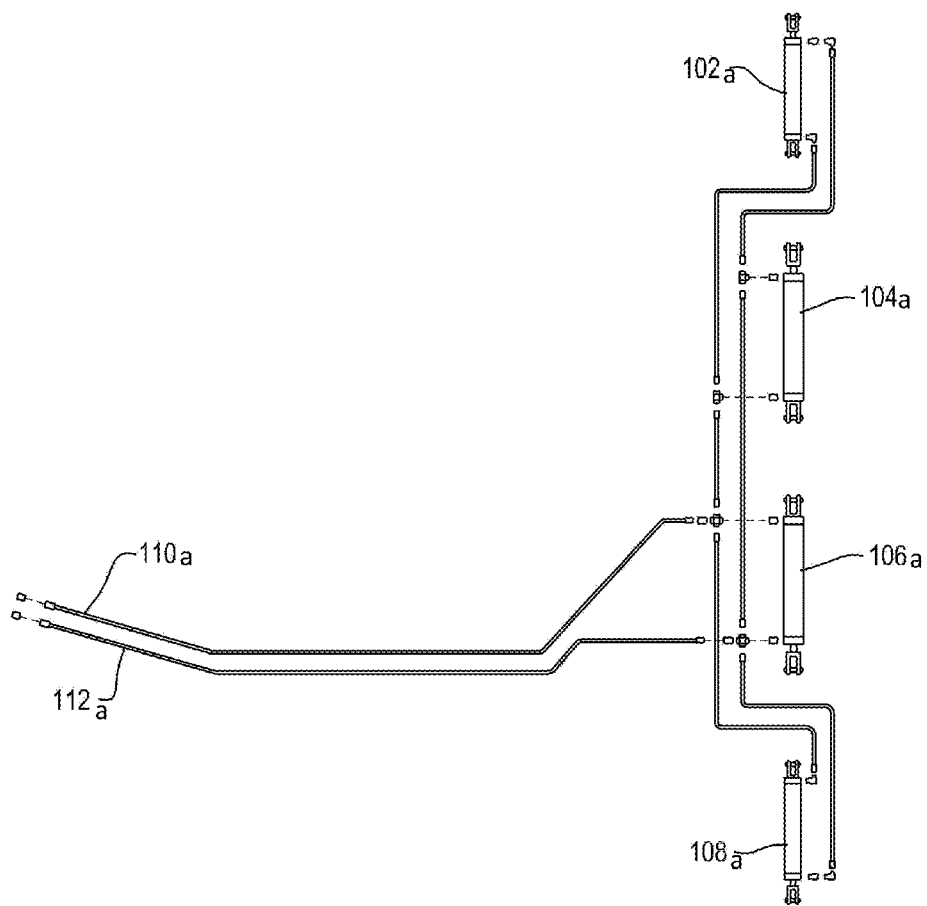
FIG. 2 is a plan view of a hydraulic system shown in the prior art for the tillage implement of FIG. 1.

The hydraulic interconnection established by a typical prior art system for elevating the various sections of the tillage implement 14 is shown in FIG. 2. In this arrangement, each of a set of actuators 102a, 104a, 106a and 108a is connected to a hydraulic control pressure by supply conduits 110a and 112a. As is illustrated in FIG. 2 the actuators 102a-108a are connected in parallel so that the pressure uniformly applies to each actuator in the set. As described above however, the actuators may become out of sync due to linkage past a piston thus requiring additional steps in the field to ensure synchronization of the actuators.

Figure 3:
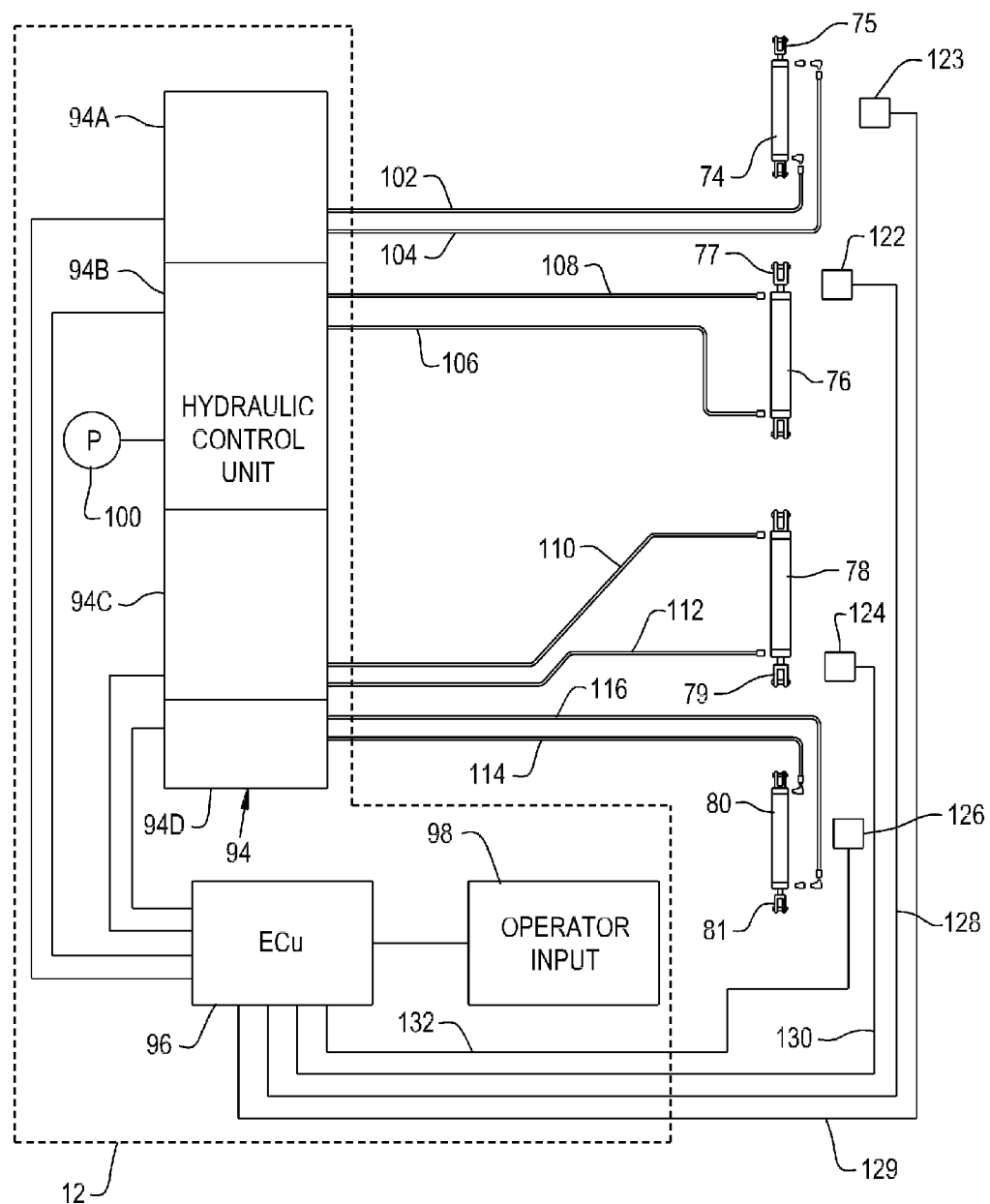
FIG. 3 is a plan view of a hydraulic system embodying the present invention.
Figure 4:
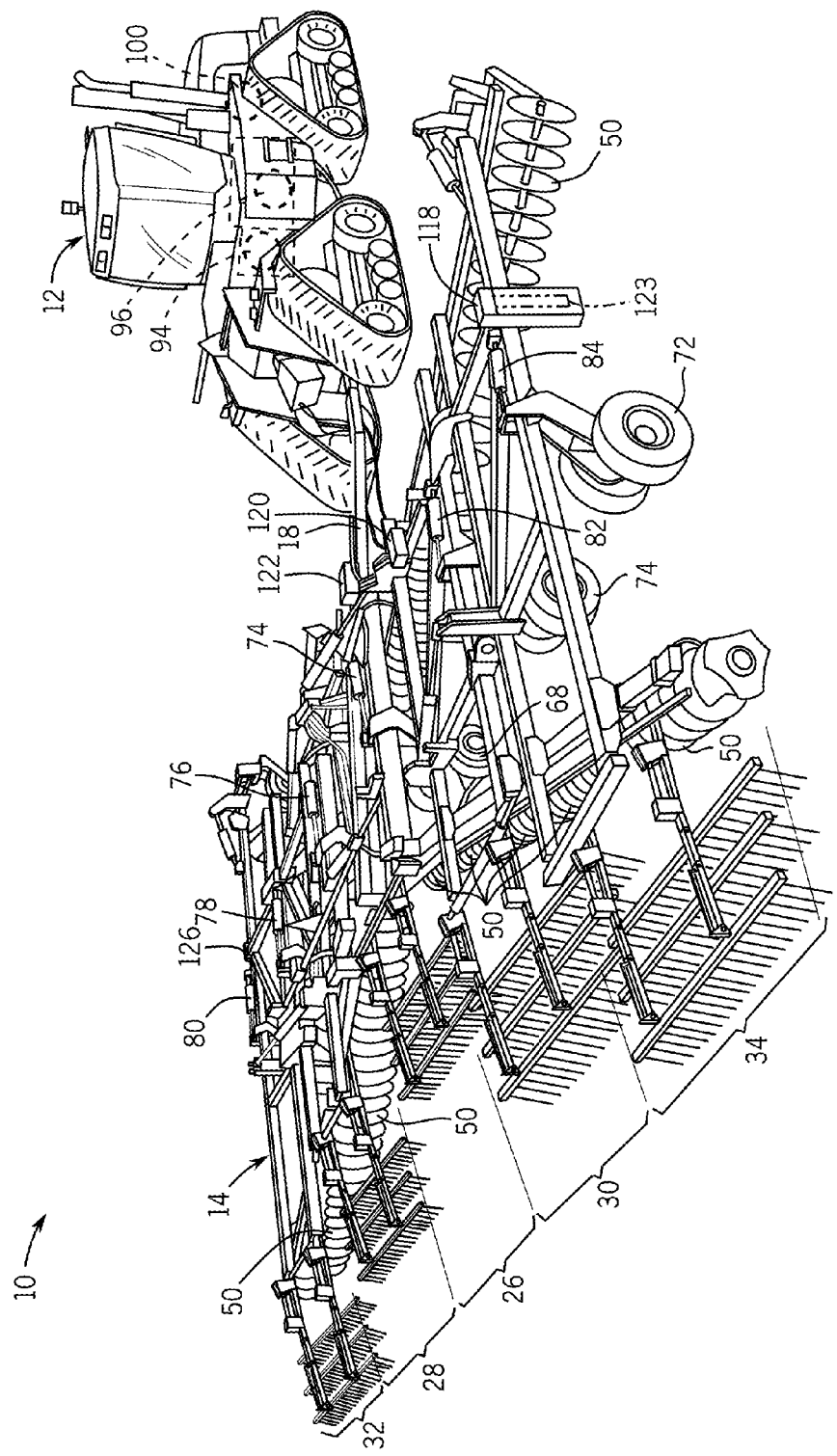
FIG. 4 is a perspective view, illustrating a plurality of frame carriers, at least one supporting element, an actuator, a vertical reference, and at least one sensor and two inclinations of the present invention.

In accordance with the present invention, a control system and method set forth in FIG. 3 overcomes these difficulties. FIG. 3 shows actuators 74, 76, 78 and 80 but the operation of the additional actuators is similar and is omitted to enable a better understanding of the present invention. Each of the actuators 74, 76, 78 and 80 has an output shaft 75, 77, 79 and 81, respectively extending from the actuator body. Each actuator has a piston displaceable within a chamber in the actuator body and connected to the respective output shaft.

The piston end of the actuator 74 is connected to the hydraulic control unit 94 by a hydraulic line 102. The output shaft end of actuator 74 is connected to the hydraulic control unit 94 by a return line 104. In similar fashion, the piston end of actuator 76 is connected by line 106 and a return line 108 is provided to control unit 94. The piston end of actuator 78 is connected to hydraulic control unit 94 by line 110 and the return line is designated as 112. Finally, the piston end of actuator 80 is connected to hydraulic control unit 94 via hydraulic line 114 and a return line 116 is provided. The independent connection of the actuators to the hydraulic control unit 94 will enable independent establishment of the height of the units relative to the soil.

The relative physical position of the hydraulic control unit 94 may be different than the one shown in FIG. 3, depending up on the application for the unit. It may be a single module or may be provided in individual control sections, as shown by 94A, 94B, 94C and 94D, with at least several of the hydraulic actuators connected hydraulically in series. However the hydraulic control unit 94 is positioned relative to the actuators, it permits independent manipulation of the actuator output shafts as will be described below.

In co-pending application entitled "REMOTE LEVELING OF TILLAGE IMPLEMENTS", of common assignment with the present invention, the displacement of the various actuators is sensed and applied to the ECU in a system for leveling the implement 14. The present invention provides a simplified version that achieves the same end of leveling the various sections of the implement. Referring to FIGS. 1 and 3, a plurality of inclinometers are mounted on the various carrier sections of the implement. Inclinometer 118 is mounted on outer wing section 34. Inclinometer 120 is mounted on inner wing section 30. Inclinometer 122 is mounted on the center section 26. Inclinometer 124 is mounted on inner wing section 28 and inclinometer 126 is mounted on outer wing section 32.

Referring to FIG. 3, the actuators dealing with the center section 26 and inner and outer sections 28 and 32 respectively will only be discussed to simplify the understanding of the invention. The inclinometers 118 and 120 operate in the same way. Inclinometer 122 on center section 26 is connected to the ECU by line 128. Inclinometer 124 for inner wing section 28 is connected to the ECU 96 by line 130. Finally inclinometer 126 is connected to the ECU 96 by line 132.

The inclinometer used in this embodiment of the invention may be any one of a number of inclinometers available in the prior art providing an appropriate signal that can be processed and utilized by the ECU 96. As described below, the inclinometer's may be set up to measure fore and aft inclination in the direction of travel 120 or they may be set up to measure inclination in a direction lateral to the direction of travel 20, or side to side inclination. Furthermore, any one of the inclinometers may be set up to measure both fore and aft and side to side inclination. In addition, there may be separate inclinometers. For example, the inclinometer 122 that would be positioned on center section 26, would measure fore and aft inclination while inclinometer 123 measures side to side inclination. The signal from optional inclinometer 123 may be fed to the ECU 96 by line 129.

The invention is applied to the tillage implement 14 of FIG. 1 by raising the implement 14 to the maximum extent where each individual actuator has its output shaft at its maximum length. At this point, a bypass port in the piston provides a bypass for return flow back to the actuator control unit 94. This ensures that any air entrained in the system due to assembly or other reason is passed to the hydraulic system.

The tillage implement is then in a position to have each of the actuators raise and lower the individual frame elements in unison to provide a uniform height above the ground and a uniform depth when the gangs of disk blades 50 are positioned in the soil. During operation of the tillage implement 14, the readings of the individual in closing inclinometer is are compared to the readings of the other inclinometer is as a measure of the degree to which the implement 14 through its various sections is level. Typically the reading from the inclinometer 122 for center section 26 is taken as the base since the wheel sets 68 for the center section are interconnected. The readings of the inclinometers 124 and 126 are compared to this reading and, to the extent they deviate from its value, cause the ECU 96 to vary control units 90 4C and 90 4D2 to operate actuators 78 or 80 to bring the sections 28 or 32 to the same inclination as that for the center section 26. This is done independently of the other actuators so that correction is applied individually to each actuator unit. This is described in connection with side to side inclination so that the implement 14 is a level from side to side. If it is desired to measure fore and aft inclination the inclinometer's may be set up for that purpose or the inclinometer 123 brought into engagement so that the actuators for castor wheels 86 and 88 may be manipulated to achieve the fore and aft implementation ensuring uniform penetration of soil by the tool elements of the forward and aft sections of tillage implement 14. The tillage implement 14 is then able to provide accurate depth of penetration among the gangs of disk harrows 50.

The implement may be conveniently adjusted in the field and during operation. The inclinometer is are all set to measure relative to the vertical reference which is set by gravity. Whether the implement is going up or down a hill are on the side of the hill or slope the inclination angles are controlled to achieve synchronization among themselves. Thus the implement 14 may be leveled during operation to achieve a level implement. It can be seen that the use of the inclinometer is enables a simplified control system that has sensors that are substantially self-contained and protected so as to increase reliability while at the same time providing an economical system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural implement spanning a lateral distance relative to a forward direction, said implement comprising:
   a plurality of carrier frames, each for supporting a plurality of soil engaging tools;
   at least one supporting element carried by each carrier frame for variably positioning the carrier frame relative to the soil;
   an actuator having a base and an variably positioned element connected between said each supporting element and said respective carrier frame for varying the inclination of said respective carrier frame relative to the vertical reference;
   at least one sensor determining the inclination of the respective carrier frame relative to the vertical reference and generating a signal;
   an actuator control unit for each actuator to move said actuator independently in response to a signal input; and
   an electronic control unit (ECU) receiving the signal from said at least one sensor for each carrier frame and comparing it to the inclination signals from the other of said sensors to send a resultant signal to said actuator control unit for varying the inclination of said at least one sensor to reach the inclination of the other of said sensors.

2. The agricultural implement of claim 1, in which the said at least one sensor is at least one of a fore and aft inclinometer and a side to side inclinometer.

3. The agricultural implement of claim 2, in which the said at least one inclinometer senses both fore and aft and side to side inclination.

4. The agricultural implement of claim 1, wherein each actuator is hydraulic and has a piston and a rod extending from the piston to provide the variably positioned element, said each actuator being hydraulically connected to said actuator control unit.

5. The agricultural implement of claim 4, further comprising a hydraulic pump for pressurizing hydraulic fluid and delivering it to said actuator control unit.

6. The agricultural implement of claim 5, in which the ECU controls said actuator control units.

7. The agricultural implement of claim 1, in which the variable carrier positioning components are wheel assemblies pivotally connected to said carrier frames for varying the distance of said carrier frames relative to the soil.

8. The agricultural implement of claim 1, in which there is a pivotal connection between the plurality of carrier frames.

9. The agricultural implement of claim 8, having a center section with a pair of wheels supporting said carrier frame and at least one pair of outer carrier frames each being supported by a wheel assembly.

10. The agricultural implement of claim 1, in which the tools are gangs of disk blades for tilling the soil.

11. The agricultural implement of claim 1, in which the ECU controls the rate of displacement for each individual actuator.

12. The agricultural implement of claim 4, wherein at least a portion of the actuators are hydraulically connected in series but able to be independently controlled.

13. A method of leveling an agricultural implement relative to the soil, said agricultural implement including a plurality of articulated carrier frames, each for supporting a plurality of soil engaging tools, at least one supporting element carried by the carrier for variably positioning the carrier frame relative to the soil and an actuator for each supporting element, the actuator having a base and a variably positioned element connected between the supporting elements and the carrier frame for setting the inclination of the carrier frame relative to the vertical reference, the method comprising the steps of:
 determining the inclination of each carrier frame relative to the vertical;
 comparing the inclination of each carrier frame relative to the inclination of the other carrier frames; and,
 correcting the inclination of said each carrier frame based on the inclination of the other carrier frames.

14. The method of claim 13, in which the inclination of each carrier frame is determined in at least one of a fore and aft direction and a side to side direction.

15. The method of claim 14, in which the inclination of the carrier frames is determined in both a fore and aft direction and a side to side direction.

16. The method of claim 13, in which the agricultural implement has a center section and at least a pair of carrier frames pivotally connected to the center section, with the inclination of the center section being the reference against which the carrier frames are corrected.

17. The method of claim 13, in which the variable positioning of the carrier frames is through wheel assemblies pivotally connected to said carrier frame and acted on by said actuators to variably position the carrier frames.

18. The method of claim 13, in which the actuators are hydraulic.

* * * * *